United States Patent [19]
Ranger et al.
[11] Patent Number: 4,841,343
[45] Date of Patent: Jun. 20, 1989

[54] DRY FILM DEVELOPMENT PROCESS FOR AN APERTURE CARD PRINTER

[75] Inventors: Michael H. Ranger, San Jose; Esther H-Q. Lim, Fremont; Robert J. Grady, Redwood City, all of Calif.
[73] Assignee: NCR Corporation, Dayton, Ohio

[21] Appl. No.: 173,214
[22] Filed: Mar. 25, 1988
[51] Int. Cl.⁴ ................ G03B 27/32
[52] U.S. Cl. ................ 355/77; 355/27; 355/30; 355/100; 355/106
[58] Field of Search ................ 355/27, 28, 100, 106, 355/77, 30

[56] References Cited

U.S. PATENT DOCUMENTS 3,475,760 10/1969 Carlson .
4,009,034 2/1977 May .
4,116,559 9/1978 Morokuma et al. .
4,332,466 1/1982 Flasck ................ 355/27
4,653,890 3/1987 Nordstrom et al. ................ 355/27
4,697,919 10/1987 Hertel ................ 355/27

*Primary Examiner*—Monroe H. Hayes
*Attorney, Agent, or Firm*—Wilbert Hawk, Jr.; Stephen F. Jewett

[57] ABSTRACT

Line broadening is eliminated in dry heat-developed films by using a development temperature which is higher than the manufacturer-recommended standard temperature, so that a much shorter development time can be used, and masking the edges of the film to prevent exposure thereof. The hot/short development cycle and the masking of the film edges substantially eliminate image smearing caused by emulsion shrinkage and migration.

6 Claims, 3 Drawing Sheets

DRY FILM DEVELOPMENT PROCESS FOR AN APERTURE CARD PRINTER

BACKGROUND OF THE INVENTION

1. Field of the Invention.

The present invention relates to the field of thermal or dry film processing and, in particular, to a dry film developer and to an associated process for heating the film to the development temperature by stretching the film across a curved heated surface.

2. State of the Dry Film Aperture Card Printing Technology.

Heat processed, dry films are known wherein images recorded on the film are developed by heating the film to its developing temperature. One example of such a dry film is the Recordak Dacomatic TM DL Film 2471 available from/manufactured by the Eastman Kodak Company of Rochester, N.Y.

The application of interest here for such dry films is computer assisted design and, more specifically, the recording of computer-generated or stored drawing or design information on a frame of dry film mounted on an aperture card using an automated aperture card printer. Referring to FIGS. 1 and 2, a typical aperture card 10 comprises a rectangular body 11 of cardboard or paper stock or other suitable material having an identification strip 17 and a rectangular aperture 12 within which is mounted a frame 13 of dry film. As shown most clearly in the enlarged non-scale cross sectional representation of FIG. 2, the film 13 comprises a base or body 14 of polymeric material such as Mylar TM or of other suitable material which is transparent to the exposing radiation and a layer 16 of photosensitive emulsion. In the printer, the image is recorded by exposing the film to a scanned laser, then is developed by heating the film to its developing temperature. Such an automated aperture card printer is described in co-pending commonly assigned U.S. patent application No. 042,210 entitled "An Aperture Card Plotter" filed Apr. 24, 1987 in the name of the inventors Semyon Spektor, Robert J. Grady, Michael H. Ranger, Wilson S. Chinn, Alexander J. McKennon and Samuel D. I. Emerson, III. A dry film developer for this automated aperture card printer is described in co-pending commonly assigned U.S. patent application Ser. No. 036,517 entitled "A Dry Film Developer For An Aperture Card Printer" filed Apr. 9, 1987 in the name of inventors Semyon Spektor, Michael Veprinsky and Michael H. Ranger. These patents are incorporated by reference in their entirety.

FIGS. 3–5 depict the referenced Spektor et al., dry film developer. A heater block assembly 20 which is provided with an arcuate projecting heating surface 22 is rigidly affixed to the ends of rods 24 mounted to base 26. The curved central portion of the heater block assembly 20 houses an electrical resistance heater 27 (FIG. 5). A spring-loaded bearing block 29 which has a recessed area 31 is slidably mounted on the two rods 24, with the associated springs 28 mounted on the rods between the heater block assembly 20 and the bearing block 29. The bearing block contains a set of guide surfaces 32 for receiving the aperture card 10.

Referring in particular to the FIG. 5 view of the front of the dry film developer, four sleeve bushings 34 extend through the heater block assembly 20 on each side of the central portion. Spring-loaded fingers 37, having arcuate gripping surfaces 38, are slidably mounted within the sleeve bushings 34. The gripping surface 38 are positioned so as to contact the aperture card 10, on each side of the frame 13 of dry film, when the bearing block 29 is urged upwardly toward the heater block assembly 20. The gripping surfaces 38 are triangularly shaped with the tips of the triangles positioned parallel to the arc of the arcuate surface 22.

In operation, as the tips of the gripping surfaces 38 contact the aperture card 10 and are urged into further contact, the tips bend outward, stretching the film 13. The stretching provided by the gripping surfaces 38 is perpendicular to the stretching provided by the arcuate heating block surface 22. The combined stretching enhances contact between the film 13 and the heated surface 22.

Referring to FIGS. 3 and 4, various mechanisms may be used to urge the bearing block 29 into the developing position. The preferred embodiment of the referenced Spektor et al., application utilizes a motor 39-driven eccentric cam 41 which contacts a roller 42 mounted to the bearing block 29.

According to the Spektor, et al., application, the heater is maintained at a selected temperature and is maintained in contact with the dry film 13 for a selected period to achieve film development. A timer (not shown) is actuated by the crescent wheel 43 along with an LED and photodetector mounted within the element 44. In the rest position, the edge 46 of the crescent wheel 43 is on the left side of the LED beam. When the motor is started the beam is broken by the crescent wheel 43 until the edge 47 appears on the right side of the beam, at which time the bearing block is in its uppermost position. The bearing block remains in that position for the required development time and then is driven to its rest position awaiting the next aperture card.

Referring further to FIGS. 3 and 4, a drive mechanism 50 is used to urge the aperture card into the correct position for developing. This mechanism includes two sets of spring-loaded pinch rollers comprising a first and second roller, 51 and 52, respectively, loaded by springs 53. The bottom set of rollers 52 is driven by a shaft 54 which in turn is driven by a pulley 56 via a drive belt (not shown).

While the referenced dry film developer has satisfied its design objectives, as usually occurs, some improvement is desired. In this case, it is desirable to provide even better image control. That is, it would be useful to provide improved image uniformity by eliminating image smearing, which is characterized by horizontal lines 18, FIG. 1, being broadened at their ends.

SUMMARY OF THE INVENTION

It is a primary object of the present invention to provide an improved dry film development process for eliminating image smearing in the developed film.

It is a related object to provide such an improved dry film development process while otherwise maintaining image quality.

Our process which satisfies the above objectives is an improvement of the dry development process described in the referenced Spektor et al., patent application for processing a dry film aperture card printer and comprises masking the peripheral border of the aperture card film to decrease exposure of the border during development; exposing the film to a selected light pattern; then developing the film by stretching the film across a curved heated surface within a heat block assembly at a selected development temperature and for a selected development time, the selected development temperature being sufficiently above the recommended or "standard" development temperature to provide a selected development time which is shorter than the development time associated with the standard temperature and the decrease in the development time being proportionately greater than the increase in the development temperature, for substantially eliminating image smearing.

For the presently preferred Recordak Dacomatic TM DL Film 2471, the preferred development time and temperature are 4 seconds and 253° F.

BRIEF DESCRIPTION OF THE DRAWINGS

The above and other aspects of the invention are described with reference to the drawings, in which.

DETAILED DESCRIPTION OF THE PREFERRED EMBODIMENTS

Figure 1:
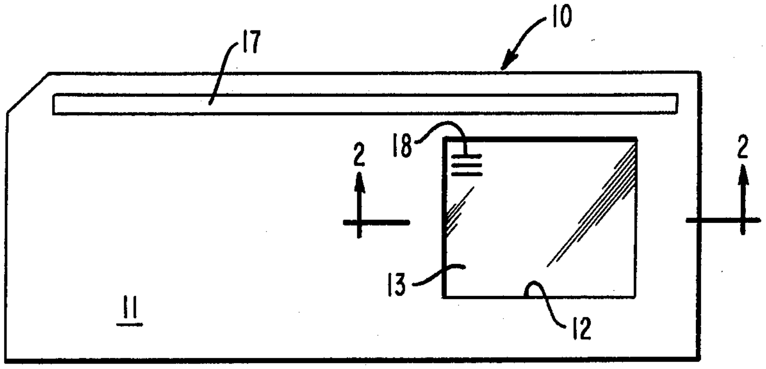
FIG. 1 depicts a dry film aperture card.
Figure 2:
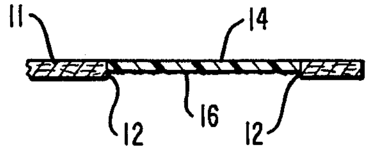
FIG. 2 is a sectional view taken along lines 2—2 through FIG. 1.

The present invention is derived from the discovery that the image smearing described above is largely the result of the film base 14 and, especially, the emulsion layer 16, FIG. 1, shrinking back from their edges (that is, from the edges of the card aperture 12) during heat development. Due to the catenary effect, the shrinkage is greater along the longer edges of the film.

Figure 4:
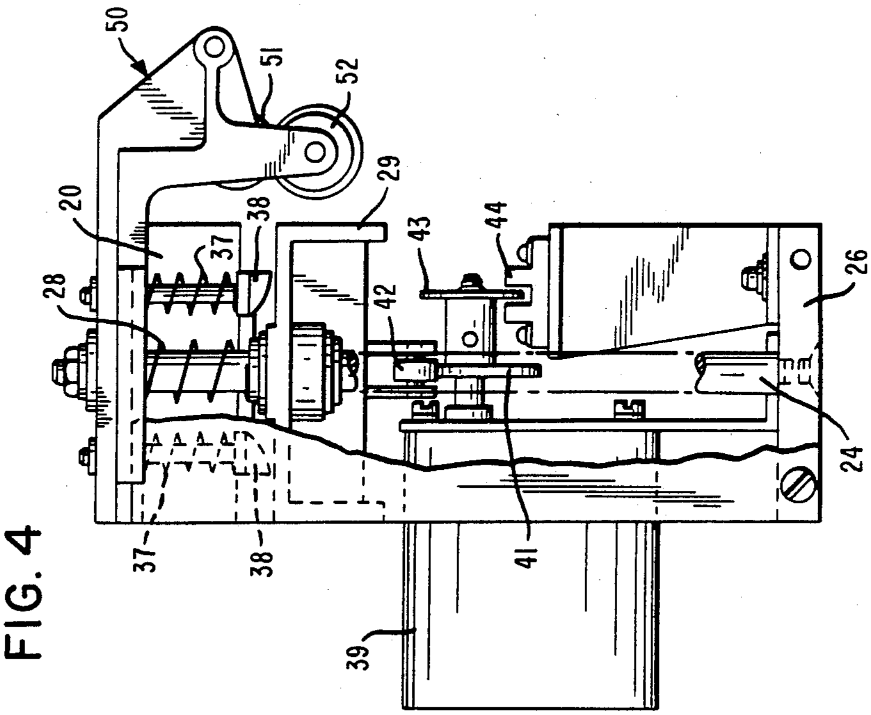
FIG. 4 is a side elevational view of the dry film developer mechanism of FIG. 3.
Figure 3:
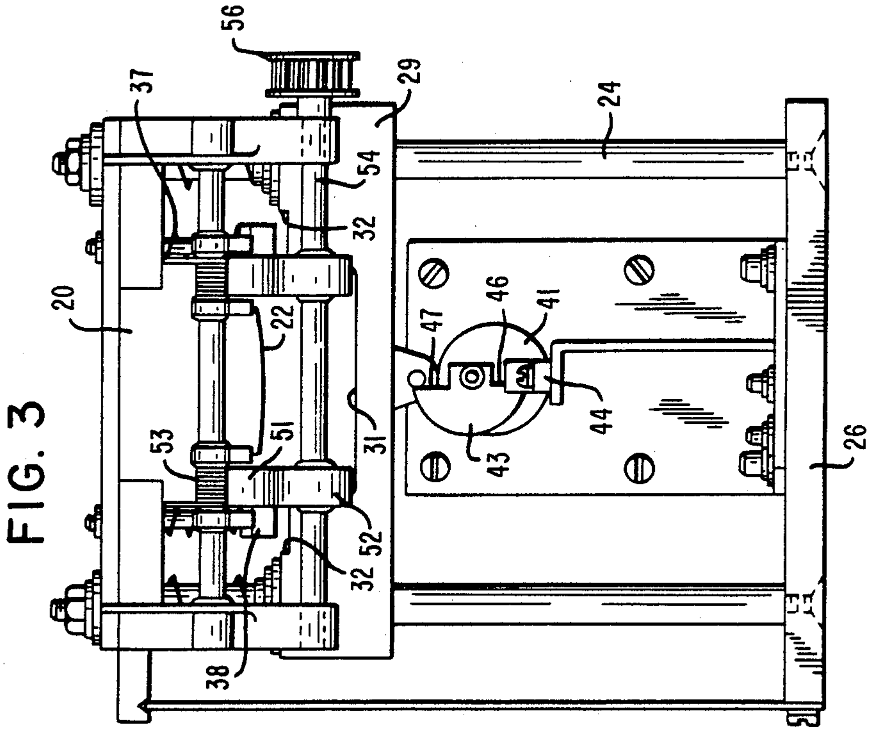
FIG. 3 is a front elevation view of a dry film developer disclosed in the referenced Spektor et al., application.

This knowledge of the source of the problem ultimately led to the discovery that the line broadening which is characteristic of image smearing could be substantially eliminated by the combination of: (1) masking the film borders during exposure to maintain a light transmissive, low heat-absorbing border during development and (2) contrary to the conventional approach which uses a low temperature and a long processing time to promote uniform development, using relatively higher development temperatures and much shorter times than are recommended by the film manufacturer, both to reduce emulsion migration and shrinkage. To our knowledge, masking the film borders is not suggested in the prior art. As mentioned, the hot/fast development approach is actually contrary to the conventional development approach, which involves heating the film to a low temperature just above its manufacturer-recommended or standard development temperature for a relatively long time, to promote uniform flow of heat throughout the film and uniform imaging. For example, the preferred Recordak Dacomatic TM DL Film 2471 mentioned above has a standard temperature of 239±3° F. Development at this temperature has required an associated development time of about 10–12 seconds using the dry film developer disclosed in FIGS. 3–5 and in the referenced Spektor et al., application.

Consider first, the effects of border masking. The preferred film is negative. In the past, substantially the entire frame 13 was exposed, with the result that the non-imaged borders were exposed and, during development, turned black. By applying a mask 60, FIG. 6, to the film borders prior to exposure and development to prevent exposure thereof and darkening, heat absorption-induced shrinkage in the border is reduced. This reduces the shrinkage and smearing and line broadening in the image-containing central region 64, FIG. 6, of the film. The unexposed, dimensionally stable light-colored border is thought to peripherally pin the emulsion and prevent its migration during development. The pre-exposure masking is easily done by taping the edges of the film, by applying a rectangular annular adherent mask, by forming the card with inwardly extending edges, etc.

Consider next, the second factor, the hot/short development cycle. The viscosity of the film emulsion remains relatively constant over an extended range (238° F.–250° F. in the case of the Recordak Dacomatic TM DL Film 2471), while the development time using the referenced dry film developer is reduced significantly at the higher temperatures within this range. As a consequence, by increasing the development temperature a relatively few degrees and proportionately a small amount, the development time can be reduced significantly and proportionately a much greater amount, thereby providing full development of the film with decreased shrinkage and migration. For example, instead of the previous development time and temperature of 12 seconds and 239° F. for the Recordak Dacomatic TM DL Film 2471, we have found that 253° F. and 4 second provide complete, uniform film development and substantially reduced shrinkage and migration. The much shorter development time (which is approximately one-third (4 min./12 min.) the development time associated with 239° F.) more than offsets the slightly higher processing temperature. The emulsion simply does not have time to migrate or shrink using this hot/fast processing.

Figure 7:
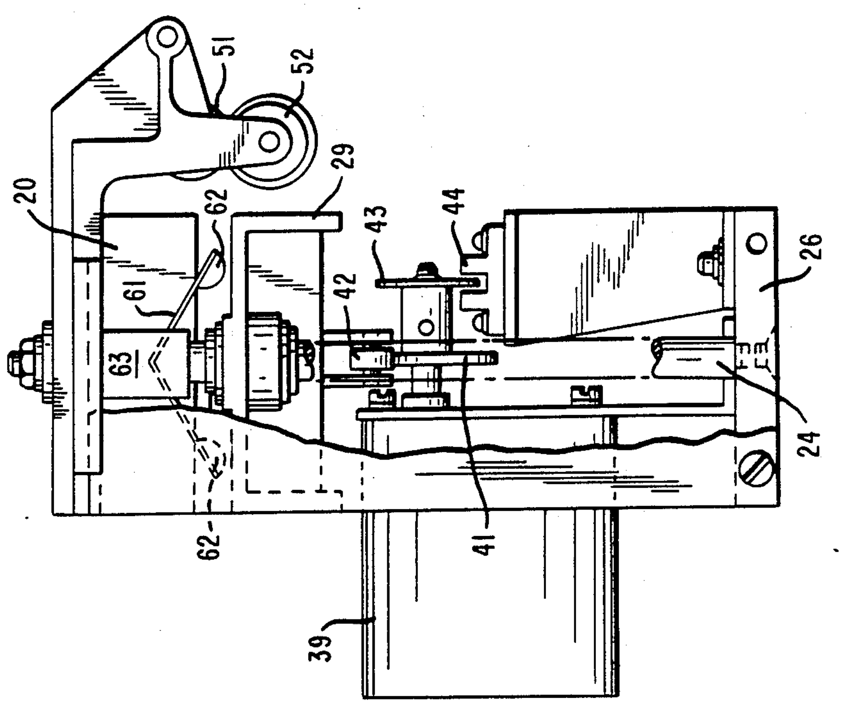
FIG. 7 is a side elevation, in the manner of FIG. 4, of an improved dry developer mechanism.
Figure 5:
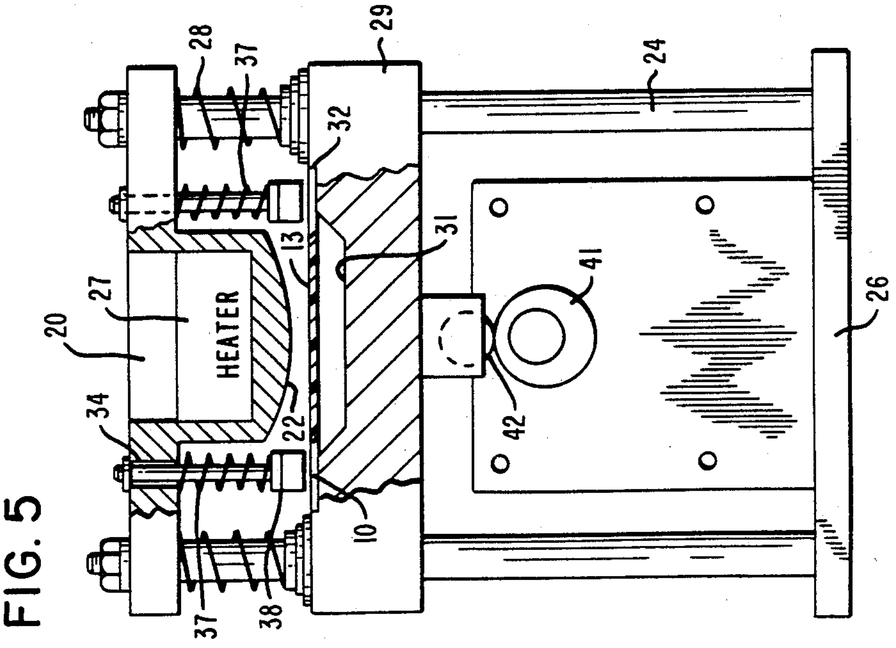
FIG. 5 is a simplified, partially cut away front view of the dry film developer mechanism of FIG. 3.

Referring to FIG. 5, the short processing times used in the above-described hot/fast development require excellent thermal contact between the film 13 and the arcuate heater body surface 22. Using the above-described, referenced dry film developer, the already excellent thermal contact can be enhanced by replacing the spring-loaded arcuate grippers 38 shown in FIG. 4 with the angled, leaf-spring 61-mounted bumpers 62 shown in FIG. 7. The two spaced springs 61 are mounted within block 63. The spring-mounted bumpers 62 provide a greater spreading force than do the spring-loaded arcuate grippers 38. As a consequence, the bumpers provide more uniform contact between the heater surface 22 and the film 13 and greater resistance to film shrinkage during heat development.

EXAMPLE 1

A frame 13 of Recordak Dacomatic TM DL Film 2471 was mounted in an aperture card 10 having apertures 2.172 inches wide×1.750 inches high. The film was exposed and developed in the aperture card printer described in the referenced Spektor et al., application using the dry developer shown in FIGS. 3–5 and described in the referenced Spektor etal., patent application. Development at the manufacturer-recommended temperature of 239° F. and the associated time of 12 seconds provided images which exhibited line broadening.

EXAMPLE 2

Figure 6:
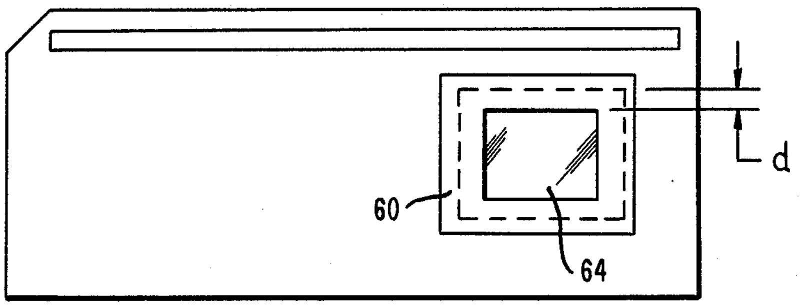
FIG. 6 depicts a masked dry film aperture card.

The same type of film described in Example 1 was mounted within a aperture card 10 and masked on all four edges using adhesive tape 60, FIG. 6, which covered a protected border strip 0.271 inches wide (d=0.100 inches) along all four edges. The film was processed as described in Example 1 except that the processing time was slightly higher, permitting a proportionately much greater reduction in development time: 253° F.×4 minutes. The film did not exhibit visible line broadening.

Having thus described a preferred embodiment of our invention, it will be understood that those of usual skill in the art will readily apply the principles described here to process other dry films with equivalent beneficial results.

What is claimed is:

1. In a process for exposing and developing a dry film and which includes:

the steps of exposing the film to a selected light pattern, then stretching the film across a curved heated surface for developing the resultant image using a standard development temperature, the steps of applying a mask to the peripheral border of the film to decrease exposure of the border and, after exposure, developing the film at a selected development temperature, the selected development temperature being sufficiently above the standard development temperature to provide a development time which is shorter than the development time associated with the standard development temperature, and the decrease in development time being proportionately greater than the increase in development temperature, for substantially eliminating image smearing.

2. The process of claim 1, wherein the masking step comprises applying a masking strip along the edges of the film.

3. The process of claim 1, wherein the film is Recordak Dacomatic TM DL Film 2471 and the selected development temperature and associated development time are approximately 253° F. and 4 seconds.

4. A process for exposing and developing a dry film having a standard development temperature and being mounted in an aperture card, the process being characterized by substantial elimination of image smearing in the developed film and comprising:

applying a radiation-blocking mask to the peripheral border of the film;

exposing the film to a selected pattern of radiation to form an image pattern therein; and stretching the film across a curved heated surface within a heater block assembly for developing the image pattern using a selected development temperature and a selected development time, the selected development temperature being above the standard development temperature and being chosen to provide a selected development time shorter than the development time associated with the standard temperature, and the decrease in time being proportionately greater than the increase in temperature.

5. The process of claim 4, wherein the masking step comprises applying a masking strip along the edges of the film.

6. The process of claim 4, wherein the film is Recordak Dacomata TM DL Film 2471 and the selected development temperature and selected development time are approximately 253° F. and 4 seconds.

* * * * *